Patented June 13, 1950

2,511,818

UNITED STATES PATENT OFFICE 2,511,818

PHOTOCHLORINATION OF PARAFFINIC HYDROCARBONS

Joseph A. Spina, Niagara Falls, N. Y., assignor to Hooker Electrochemical Company, Niagara Falls, N. Y., a corporation of New York No Drawing. Application September 7, 1945, Serial No. 615,088

5 Claims. (Cl. 204—163)

My invention relates more particularly to chlorinated paraffinic hydrocarbons of relatively high chlorine content, and specifically to chlorination of paraffinic hydrocarbons of the type known as "kerosenes," by which I intend to designate those oily but somewhat volatile paraffinic hydrocarbons having 10 to 16 carbon atoms.

The chlorination of both paraffinic and cyclic hydrocarbons is well known and many uses have been found for the resulting products. For example, such products have been found useful as softening agents for natural and synthetic plastics and film strengthening addition agents for lubricants; also as ingredients of compositions to be used for impregnating various materials, including textiles, for the purpose of increasing their resistance to atmospheric oxidation, deterioration under active light, and growth of parasitic plants, such as mildew. These products are also useful in reducing the inflammability of such fabrics and imparting to them water repellent properties.

For these purposes products resulting from the chlorination of the cyclic hydrocarbons, paraffin waxes and related hydrocarbon materials have come to be largely used, but the demand for these materials has now begun to be such as to call for quantities of these hydrocarbons in excess of the available supply.

These chlorinated hydrocarbons have commonly contained 20 to 40 per cent chlorine. It is possible to chlorinate certain cyclic hydrocarbons up to 60 per cent chlorine, but the product if pure is generally crystalline and of unsatisfactory solubility in lubricating oils. It is known that paraffin waxes may be chlorinated up to 70 per cent chlorine, but this is a difficult process, necessitating the use of a solvent to maintain the material in liquid phase during the chlorination. This solvent must of course be distilled off afterward, and this involves an extra step and loss of a certain percentage of the solvent. Moreover, even with the aid of such solvents the difficulties of chlorinating the paraffin waxes to 70 per cent chlorine are not entirely eliminated. Unless the chlorination is carried on under pressure the solvent itself tends to distill off and must be refluxed. Also, notwithstanding the presence of such solvents, troublesome foaming is still liable to take place.

A class of hydrocarbons that are still cheap and plentiful is that constituted by the kerosenes. These have been chlorinated up to 20 or 30 per cent chlorine, but few uses have been found for resulting product. They are too fluid for use as softening agents in plastics or impregnating agents for fabrics and too unstable for use in lubricants, except for certain specific and quite limited purposes, tending to give off chlorine as HCl.

There, therefore, exists an urgent need for a class of chlorinated hydrocarbon products having characteristics not completely met by any existing chlorinated paraffinic or cyclic hydrocarbons and which can be made from raw materials that are still plentiful.

In this situation I have experimented with the kerosenes and have now discovered that by a process to be described these may be chlorinated up to a chlorine content of approximately 65 per cent, without resort to pressure or the use of a solvent, and that the product has in high degree the stability and other properties sought for the purposes above enumerated.

In order to afford a true measure or basis for comparison of stabilities, I have adopted a standard procedure which involves heating a weighed sample of material (e. g., 25 grams) for a given time (e. g., 16 hours) at a given temperature (e. g., 284° F. or 140° C.) in special apparatus so designed that the HCl given off is all absorbed in a known quantity of water. The loss of chlorine is expressed as mg. per 25 grams sample or as a percentage of the original chlorine content.

Because of the volatility of kerosene and the consequent danger of explosion in the vapor space above the liquid, it is impractical to initiate chlorination of kerosene under atmospheric pressure at a temperature much above 85° C., unless it be shielded from the light. Kerosene may be chlorinated in actinic light at 75° to 85° C., with cooling, up to a chlorine content of 35 or 45 per cent, but the resulting product is very unstable. Beyond this point it is difficult to carry the chlorination in this temperature range, because the increasing inertness of the material toward chlorine causes such a large proportion of the chlorine to go through the material to the exit uncombined as to render the process commercially impracticable.

It has been generally supposed that paraffinic hydrocarbons could not be chlorinated at temperatures in the range of 150° C. without decomposition and darkening of the product. However, I have found that if kerosene is chlorinated under actinic light at 75° to 85° C. up to a chlorine content of 25 or 35 per cent, the temperature may then be permitted to rise slowly to a maximum of 160° or 170°, and the chlorination continued up to a chlorine content of about 65 per cent, with high chlorine efficiency throughout and without material decomposition of the product.

This is illustrated by Examples I to III, in which kerosene of ordinary commercial grade having a boiling range corresponding to 10 to 16 carbon atoms was chlorinated in laboratory apparatus at atmospheric pressure in the absence of a solvent, under the conditions indicated below:

*Example I*

| Lighting Conditions | Temperature | | Chlorine per cent final | Loss of Cl₂ 16 hrs at 140° C. mg. per 25 grams |
|---|---|---|---|---|
| | to 35% chlorine | at finish | | |
| | °C. | °C. | | |
| A Light | 85 | 124 | ¹ 55.7 | 244 |
| B Light | 85 | 160 | ¹ 55.4 | 136 |
| C Dark | 160 | 160 | ¹ 55.8 | 130 |

¹ Chlorinations A, B, C were stopped at as nearly as possible the same chlorine content.

Comparison of chlorinations A and B shows that the stability of the product is improved by finishing at the highest practicable temperature. Comparison of chlorinations B and C shows that there is little improvement in stability in starting at this high temperature, which of course, involves rigid exclusion of light to avoid explosion.

*Example II*

| Lighting Conditions | Temperature | | Chlorine per cent in exit gases at— | | |
|---|---|---|---|---|---|
| | to 35% chlorine | at finish | 20% | 40% | finish |
| | °C. | °C. | | | |
| D Light | 85 | 160 | 5.5 | 2.8 | ¹ 42.6 |
| E Dark | 160 | 160 | 22.5 | 34.7 | ² 47.0 |

¹ Final chlorine content 55.7%.
² Final chlorine content 56.8%.

Comparison of chlorinations D and E shows that the efficiency of absorption of the chlorine is much better when starting at 85° C. and finishing at 160° C. under actinic light than when chlorinating all the way at 160° C. in darkness.

*Example III*

| Lighting Conditions | Temperature | | Temperature rise Per hour, degrees centigrade | NPA color |
|---|---|---|---|---|
| | to 35% chlorine | at finish | | |
| | °C. | °C. | | |
| F Light | 85 | 160 | 75 | 70 |
| G Light | 85 | 160 | 10 | 6— |

Comparison of chlorinations F and G shows that, with other conditions the same, gradual rise in temperature after the chlorine content has reached 35 per cent gives a product of much lighter color than if the temperature is allowed to rise quickly.

In the foregoing examples, which were on a laboratory scale and in which the conditions of chlorination were varied, an effort was made to stop the chlorination at the same final chlorine content. The following example, which was carried out on a plant scale, is given to show the effect on stability of the product as the chlorine content increases, under uniform chlorination conditions.

*Example IV*

| Lighting Conditions | Temperature | | Final per cent Chlorine | Loss of chlorine in 16 hours at 140° C. mg. per 25 grams |
|---|---|---|---|---|
| | to 35% chlorine | at finish | | |
| | °C. | °C. | | |
| H Light | 85 | 160 | 51.1 | 367 |
| Do | 85 | 160 | 56.8 | 315 |
| Do | 85 | 160 | 58.2 | 310 |
| Do | 85 | 160 | 60.5 | 264 |
| Do | 85 | 160 | 62.5 | 151 |
| Do | 85 | 160 | 63.9 | 137 |

Chlorination H shows that the stability of the product improved during the chlorination from 51.1 per cent to 63.9 per cent chlorine, at a constant temperature of 160° C. While these results do not exactly check with those of Example I, this is only because of the difference in scale of operation, which may have caused local differences of temperatures.

To recapitulate, Examples I and IV show that stability is improved by finishing the chlorination at the highest practicable temperature and carrying the chlorination to the highest chlorine content practicable at the temperature. Example I also shows that it is immaterial from the standpoint of the final result, whether the chlorination is carried out all the way at the finishing temperature, which involves difficulties and danger of explosion during the initial stage, or by starting at a conservative temperature and finishing at the higher temperature, which is by all means the safer and more practicable method of procedure. Example II shows that this can be done with the highest chlorine efficiency by chlorinating under actinic light at moderate temperature up to a chlorine content of about 35 per cent and then causing the temperature to rise to the highest temperature that is practicable. Example III shows that when the chlorination has been carried part way at a moderate temperature and is then caused to rise, the rise should be very gradual, otherwise the product will be impaired. These four examples therefore present a complete picture of a novel and efficient method of chlorinating semi-volatile hydrocarbons of the range from 10 to 16 carbon atoms in liquid phase, without the use of pressure or a solvent.

At the conclusion of the chlorination of hydrocarbons it is customary to blow air through the product to remove HCl. I have found, however, that if this is done at the temperature of chlorination, the product will be seriously injured, not only by darkening, but also by impairment of stability. I therefore allow the temperature to fall to 100° C. before air blowing. I also find that if chlorine is bubbled through while the temperature is falling, there is an improvement in lightness of color.

My products containing up to 57 per cent chlorine are clear oily red liquids, miscible with hydrocarbon oils, while those containing 60 to 65 per cent chlorine are extremely viscous semi-fluids, barely flowing at room temperature, and of low solubility in volatile hydrocarbon solvents, such as gasoline. Moreover, my products, unpurified except for the usual blowing with an inert gas to remove hydrogen chloride, are almost odorless; whereas products obtained by chlorination of kerosene have heretofore been generally characterized by an extremely pungent, unpleasant odor. These properties render my products available for a whole series of new uses, for which the chlorinated paraffins have hitherto been unsuited. Thus, on account of their stability, my liquid products are particularly well suited to incorporation in lubricating oils as film strengthening agents. My viscous products are suitable for use as softening agents for plastics and impregnating agents for fabrics.

It is well known that the inflammability of chlorinated hydrocarbons decreases with increase in chlorine content. As might be expected, therefore, my products are found to impart to textiles a high resistance to combustion.

When heated to approximately 60° C. the wetting power of my product is such that it thoroughly penetrates the fibres of textile fabrics and imparts to them water repellent and weather resistant properties in high degree. My products are also superior to those heretofore available for impregnation of fabrics in respect to the low temperatures at which the fabrics treated therewith continue to possess satisfactory flexibility. Thus, fabrics impregnated with chlorinated hydrocarbons and related materials heretofore available have generally tended to become brittle, and hence difficult to handle or even fragile, at low winter temperatures. Fabrics impregnated with compositions containing my material, on the contrary, may retain their flexibility down to any winter temperature likely to be met with in any temperate climate.

Since kerosene includes paraffinc hydrocarbons of 10 to 16 carbon atoms, it is evident that my process is applicable to any paraffine within this range.

By "actinic light" is meant any light that is effective in catalyzing the reaction. An example of a highly actinic light is that of the mercury vapor lamp, but I do not wish to be limited thereto, as any light in the visual range is more or less actinic, and any light in the ultraviolet range highly so.

I claim as my invention:

1. The process for chlorination of paraffinic hydrocarbons of 10 to 16 carbon atoms to yield a light colored product giving up not more than 300 mg. of its chlorine per 25 grams in 16 hours at 140° C., which comprises: passing gaseous chlorine into the hydrocarbon, while maintaining the temperature at 75° to 85° C., under actinic light, at least during the initial stages of the reaction, until the hydrocarbon has acquired a chlorine content of 25 to 35 per cent; then causing the temperature to rise at not over 12° C. per hour to between 160° to 170° C.; and continuing the introduction of chlorine at said temperature until the hydrocarbon has acquired a chlorine content of not less than 60 per cent.

2. The process for chlorination of paraffinic hydrocarbons of 10 to 16 carbon atoms to yield a light colored product giving up not more than 200 mg. of its chlorine per 25 grams in 16 hours at 140° C., which comprises: passing gaseous chlorine into the hydrocarbon, while maintaining the temperature at 75° to 85° C., under actinic light, at least during the initial stages of the reaction, until the hydrocarbon has acquired a chlorine content of 25 to 35 per cent; then causing the temperature to rise at not over 12° C. per hour to between 160° to 170° C.; and continuing the introduction of chlorine at said temperature until the hydrocarbon has acquired a chlorine content of 62 to 65 per cent.

3. The process for chlorination of paraffinic hydrocarbons of 10 to 16 carbon atoms to yield a light colored product of high stability which comprises: passing gaseous chlorine into the hydrocarbon while maintaining the temperature at 75° to 85° C., under actinic light, at least during the initial stages of the reaction, until the hydrocarbon has acquired a chlorine content of 25 to 35 per cent; then causing the temperature to rise at not over 12° C. per hour to between 160° to 170° C.; continuing the introduction of chlorine at said temperature until the hydrocarbon has acquired a chlorine content in excess of 59 per cent; causing the temperature to drop while bubbling chlorine through the product; and air-blowing the product at not over 100° C.

4. The process for production of chlorination derivatives of paraffinic hydrocarbons of 10 to 16 carbon atoms, ranging from oily liquids to viscous semi-fluids, substantially free from the characteristic odor of such hydrocarbons and their chlorination derivatives, of light color and high stability, which comprises: passing gaseous chlorine into the hydrocarbon at 75° to 85° C., under actinic light at least during the initial stages of the reaction, until the chlorinated hydrocarbon has acquired a chlorine content of 25 to 35 per cent; causing the temperature to rise at not over 12° per hour to between 160° to 170° C.; and continuing to pass chlorine into the chlorinated hydrocarbon at said temperature until it has acquired a chlorine content of 50 to 65 per cent.

5. The process for production of chlorination derivatives of mixtures of paraffinic hydrocarbons of 10 to 16 carbon atoms, ranging from oily liquids to viscous semi-fluids, substantially free from the characteristic odor of such hydrocarbons and their chlorination derivatives, giving off not more than 367 mgs. of chlorine as hydrogen chloride when maintained at 140° C. for 16 hours, which comprises: passing gaseous chlorine into the hydrocarbon at 75° C. to 85° C. under actinic light at least during the initial stages of the reaction, until the chlorinated hydrocarbon has acquired a chlorine content of 25 to 35 per cent; causing the temperature to rise to between 160° and 170° C.; and continuing to pass chlorine into the chlorinated hydrocarbon at said temperature until it has acquired a chlorine content of 50 to 65 per cent.

JOSEPH A. SPINA.

REFERENCES CITED

The following references are of record in the file of this patent:

UNITED STATES PATENTS

| Number | Name | Date |
| --- | --- | --- |
| 2,065,323 | Thomas | Dec. 22, 1936 |
| 2,242,226 | Bley | May 20, 1941 |
| 2,247,365 | Flett | July 1, 1941 |

OTHER REFERENCES

Dean et al.: Industria and Engineering Chemistry, vol. 37, (Feb. 1945), pp. 181-185.